United States Patent
Tanioka et al.

(10) Patent No.: US 9,759,111 B2
(45) Date of Patent: Sep. 12, 2017

(54) CONTROL TECHNIQUES OF EXHAUST PURIFICATION SYSTEM AND EXHAUST PURIFICATION SYSTEM

(71) Applicant: Bosch Corporation, Tokyo (JP)

(72) Inventors: Kenichi Tanioka, Saitama (JP); Masanori Watanabe, Saitama (JP)

(73) Assignee: Bosch Corporation, Tokyo (JP)

( * ) Notice: Subject to any disclaimer, the term of this patent is extended or adjusted under 35 U.S.C. 154(b) by 100 days.

(21) Appl. No.: 14/780,622

(22) PCT Filed: Feb. 14, 2014

(86) PCT No.: PCT/JP2014/053424
§ 371 (c)(1),
(2) Date: Sep. 28, 2015

(87) PCT Pub. No.: WO2014/156355
PCT Pub. Date: Oct. 2, 2014

(65) Prior Publication Data
US 2016/0061080 A1    Mar. 3, 2016

(30) Foreign Application Priority Data

Mar. 27, 2013   (JP) .................................. 2013-067089

(51) Int. Cl.
*F01N 9/00* (2006.01)
*F01N 3/20* (2006.01)
(Continued)

(52) U.S. Cl.
CPC ............. *F01N 3/208* (2013.01); *B01D 53/94* (2013.01); *B01D 53/9495* (2013.01); *F01N 3/02* (2013.01);
(Continued)

(58) Field of Classification Search
CPC .. F01N 9/005; F01N 11/005; F01N 2610/146; F01N 2610/1493;
(Continued)

(56) References Cited

FOREIGN PATENT DOCUMENTS

| CN | 101821485 | 9/2010 |
|----|-----------|--------|
| CN | 102395763 | 3/2012 |

(Continued)

OTHER PUBLICATIONS

Machine translation of JP2012017687A, accessed Mar. 2, 2017.*
(Continued)

*Primary Examiner* — Jonathan Matthias
(74) *Attorney, Agent, or Firm* — Michael Best & Friedrich LLP

(57) ABSTRACT

To provide an exhaust purifying system and a method for controlling the exhaust purifying system that avoid occurrence of clogging, breakage, or the like of a reducing agent injection valve caused by the solidification of a reducing agent and prevent reduction in the efficiency of reducing agent recovery processing and exhaust gas purification.

An exhaust purifying system and a method for controlling the exhaust purifying system according to an aspect of the present invention is configured to detect the injection valve temperature of the reducing agent injection valve according to detection of turn-off of an ignition switch for stopping the internal combustion engine or detection of an injection stop of the reducing agent injection valve, whichever is earlier, calculate the waiting time until reducing agent recovery processing starts based on the injection valve temperature, and permits the reducing agent recovery processing under condition of the detection of turn-off of the ignition switch and an elapse of the waiting time.

13 Claims, 8 Drawing Sheets

(51) Int. Cl.
| | |
|---|---|
| *F01N 3/08* | (2006.01) |
| *F01N 3/24* | (2006.01) |
| *F01N 3/02* | (2006.01) |
| *F01N 3/025* | (2006.01) |
| *F01N 3/029* | (2006.01) |
| *F01N 3/021* | (2006.01) |
| *F01N 11/00* | (2006.01) |
| *F01N 3/023* | (2006.01) |
| *B01D 53/94* | (2006.01) |

(52) U.S. Cl.
CPC ............ *F01N 3/021* (2013.01); *F01N 3/025* (2013.01); *F01N 3/029* (2013.01); *F01N 3/08* (2013.01); *F01N 3/24* (2013.01); *F01N 9/00* (2013.01); *F01N 9/002* (2013.01); *F01N 11/002* (2013.01); *B01D 53/944* (2013.01); *B01D 53/9418* (2013.01); *B01D 53/9459* (2013.01); *B01D 53/9477* (2013.01); *B01D 2251/2067* (2013.01); *F01N 3/023* (2013.01); *F01N 2550/05* (2013.01); *F01N 2570/14* (2013.01); *F01N 2610/02* (2013.01); *F01N 2610/11* (2013.01); *F01N 2610/144* (2013.01); *F01N 2610/146* (2013.01); *F01N 2610/1493* (2013.01); *F01N 2900/0422* (2013.01); *F01N 2900/08* (2013.01); *F01N 2900/1602* (2013.01); *F01N 2900/1811* (2013.01); *Y02T 10/24* (2013.01); *Y02T 10/47* (2013.01)

(58) Field of Classification Search
CPC ..... F01N 2900/0422; F01N 2900/1811; F01N 2900/1821
See application file for complete search history.

(56) References Cited

FOREIGN PATENT DOCUMENTS

| | | |
|---|---|---|
| JP | 2008101564 | 5/2008 |
| JP | 2009097348 | 5/2009 |
| JP | 2012017687 A * | 1/2012 |
| JP | 2012137041 A | 7/2012 |
| JP | 5087188 | 11/2012 |
| JP | 2013096258 | 5/2013 |
| JP | 2013113195 | 6/2013 |
| WO | 2010119711 | 10/2010 |

OTHER PUBLICATIONS

Machine translation of JP2012137041A, accessed Mar. 2, 2017.*
International Search Report for Application No. PCT/JP2014/053424 dated Mar. 25, 2014 (English Translation, 2 pages).

* cited by examiner

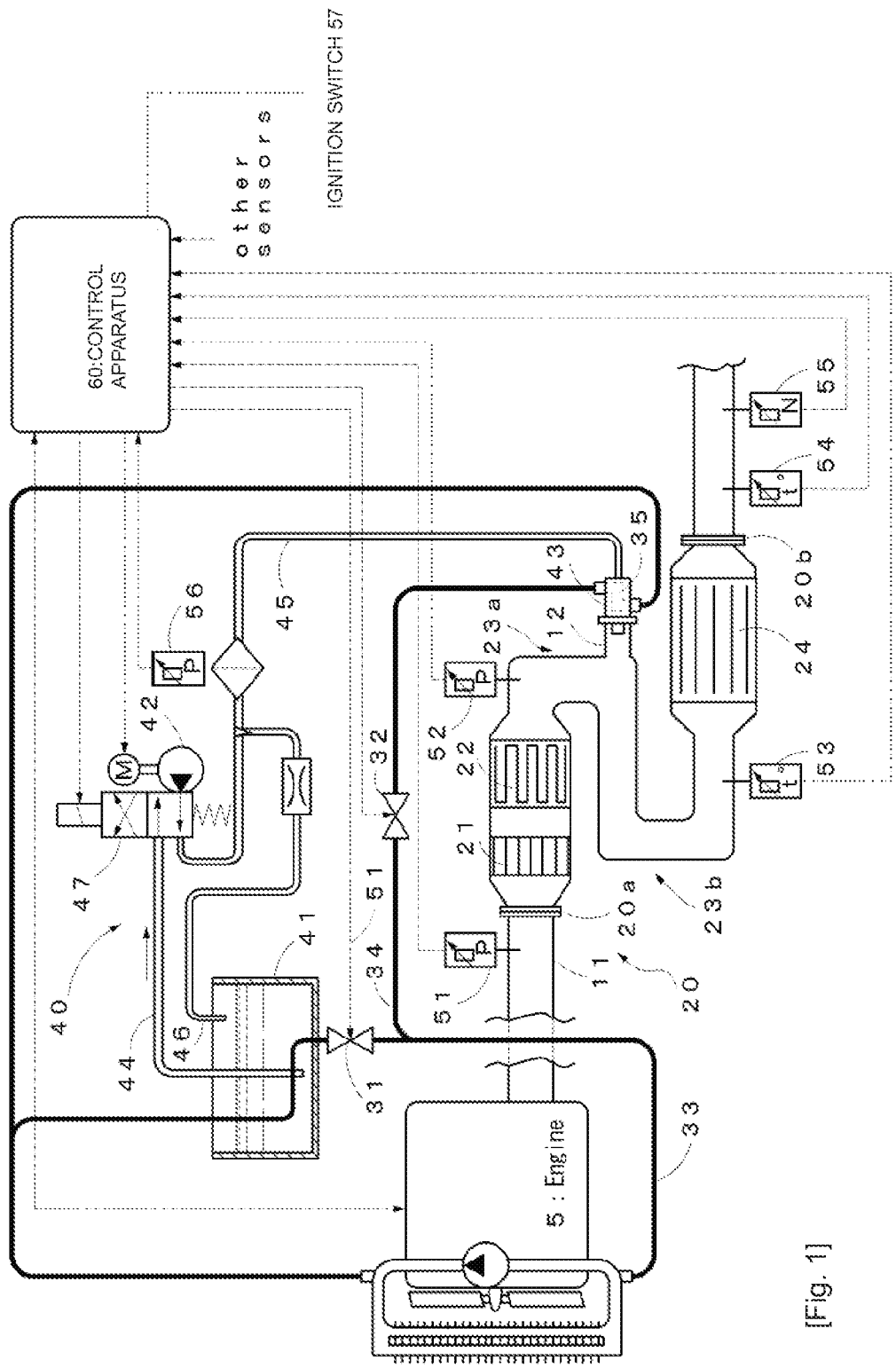
[Fig. 1]

[Fig.2]
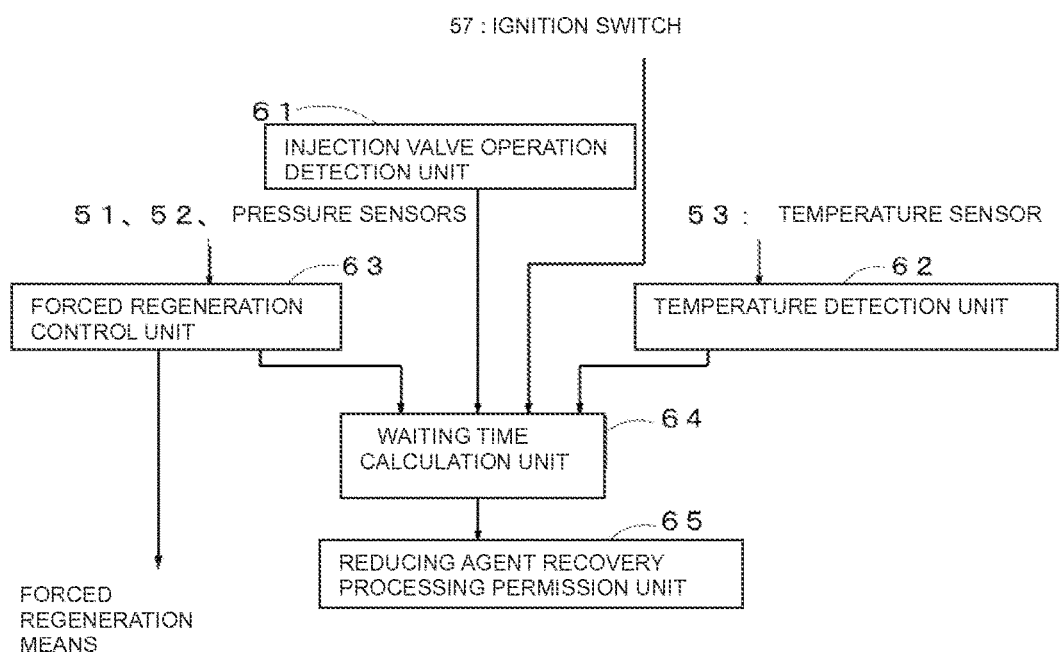

[Fig.3]
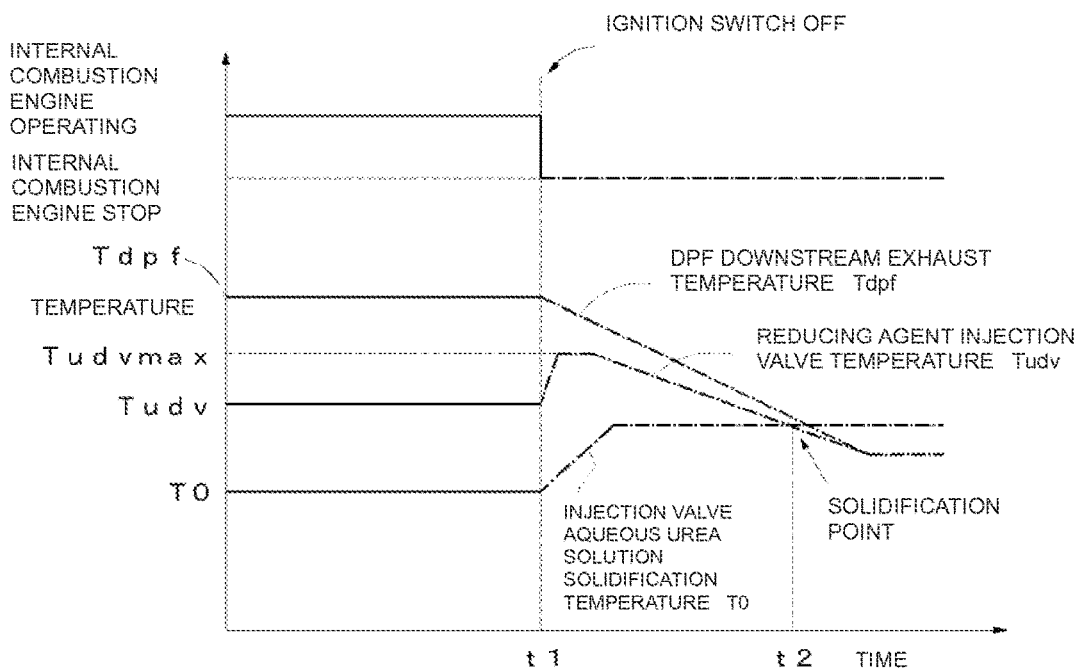

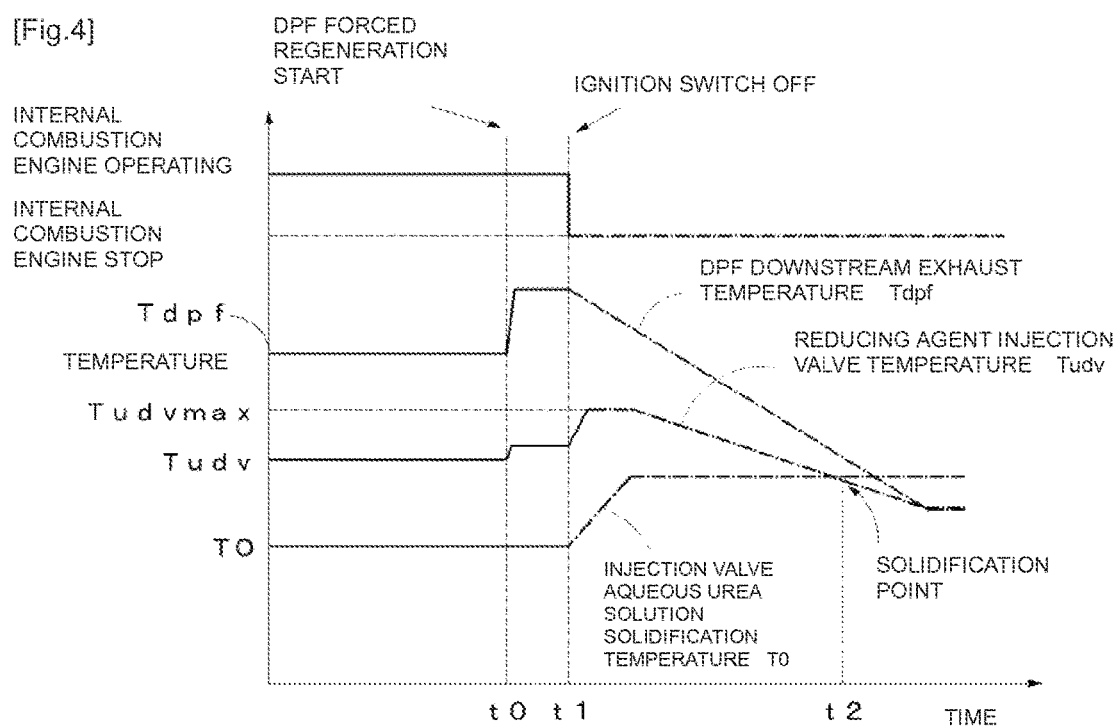

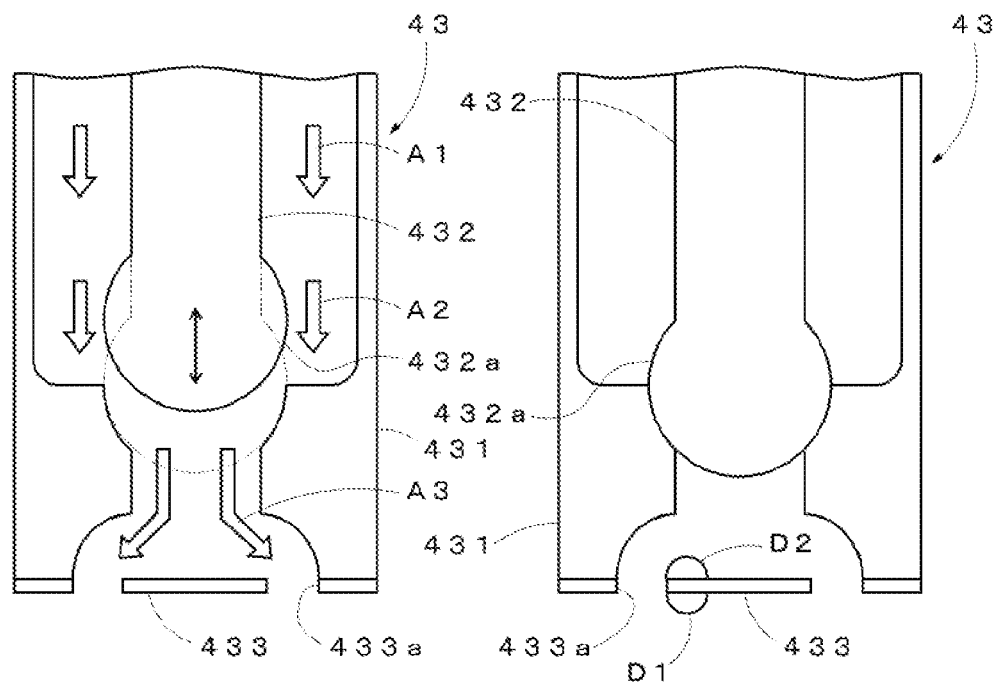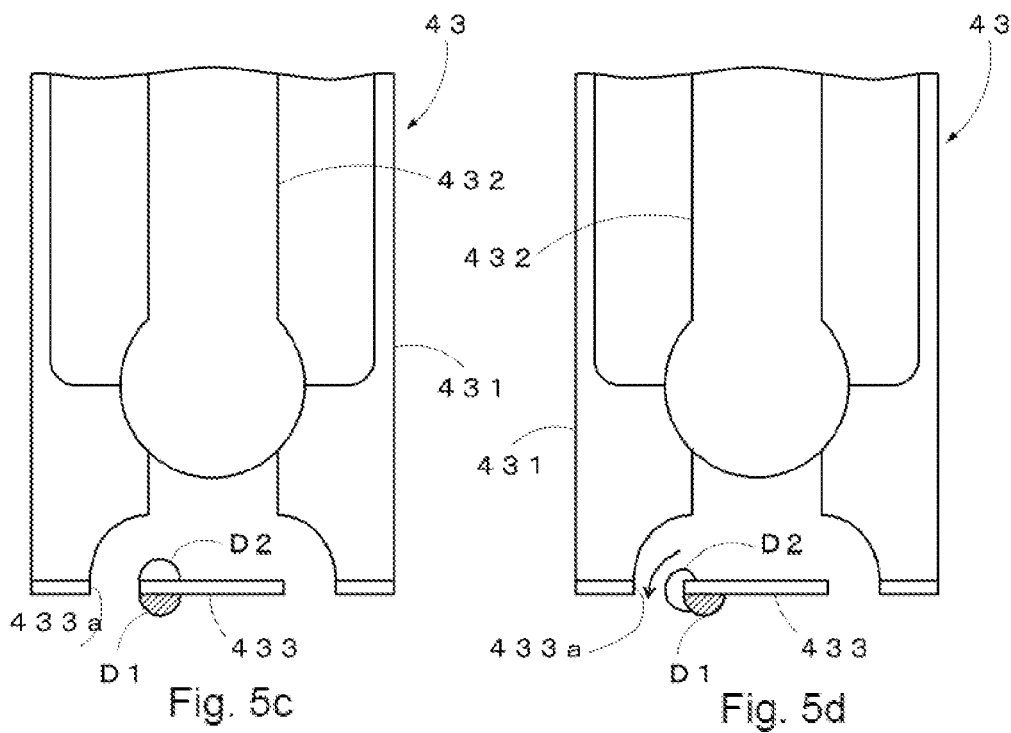

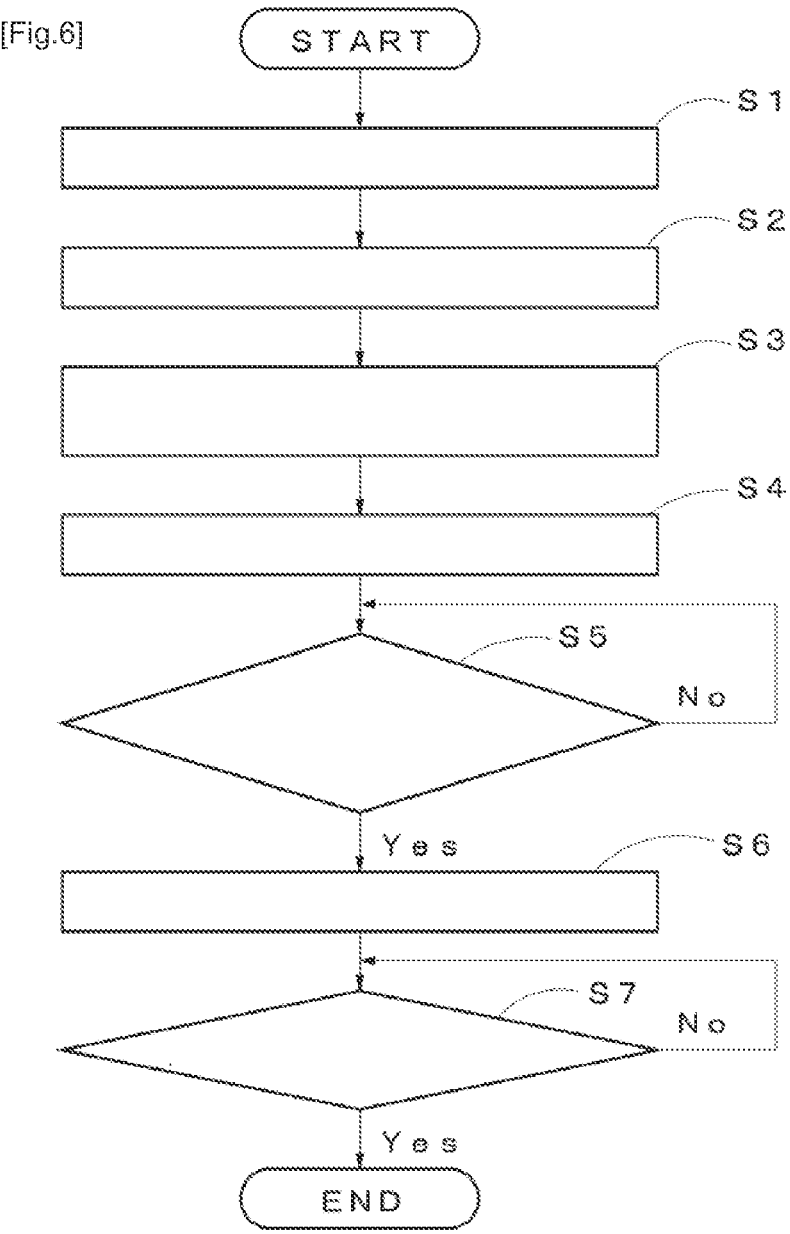
S1 DETECT TURN-OFF OF IGNITION SWITCH
S2 DETECT OR ESTIMATE INJECTION VALVE TEMPERATURE Tudv
S3 CALCULATE WAITING TIME T1 BASED ON INJECTION VALVE TEMPERATURE Tudv
S4 START MEASURING TIME T USING TIMER
S5 MEASURED TIME T HAS REACHED WAITING TIME T1? (T ≥ T1?)
S6 START REDUCING AGENT RECOVERY PROCESSING
S7 REDUCING AGENT RECOVERY PROCESSING IS COMPLETED?

[Fig.7]

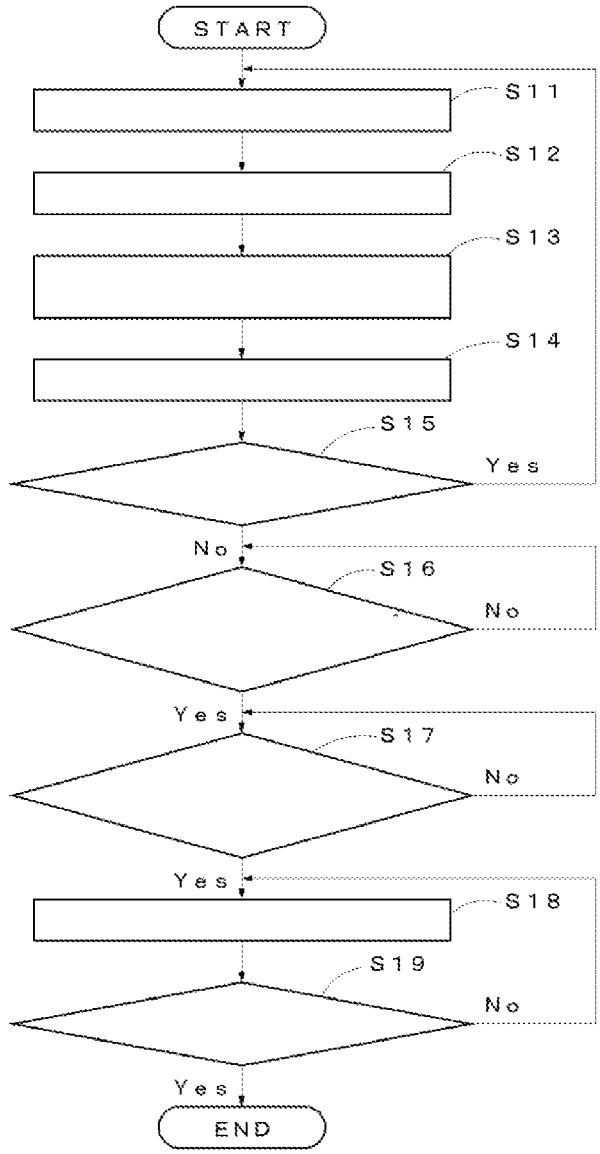

S11  DETECT INJECTION STOP OF REDUCING AGENT INJECTION VALVE
S12  DETECT OR ESTIMATE INJECTION VALVE TEMPERATURE Tudv
S13  CALCULATE WAITING TIME T1 BASED ON INJECTION VALVE TEMPERATURE Tudv
S14  START MEASURING TIME T USING TIMER
S15  INJECTION FROM REDUCING AGENT INJECTION VALVE HAS BEEN DONE?
S16  TURN-OFF OF IGNITION SWITCH HAS BEEN DETECTED?
S17  MEASURED TIME T HAS REACHED WAITING TIME T1? (T ≥ T1?)
S18  START REDUCING AGENT RECOVERY PROCESSING
S19  REDUCING AGENT RECOVERY PROCESSING IS COMPLETED?

[Fig.8]
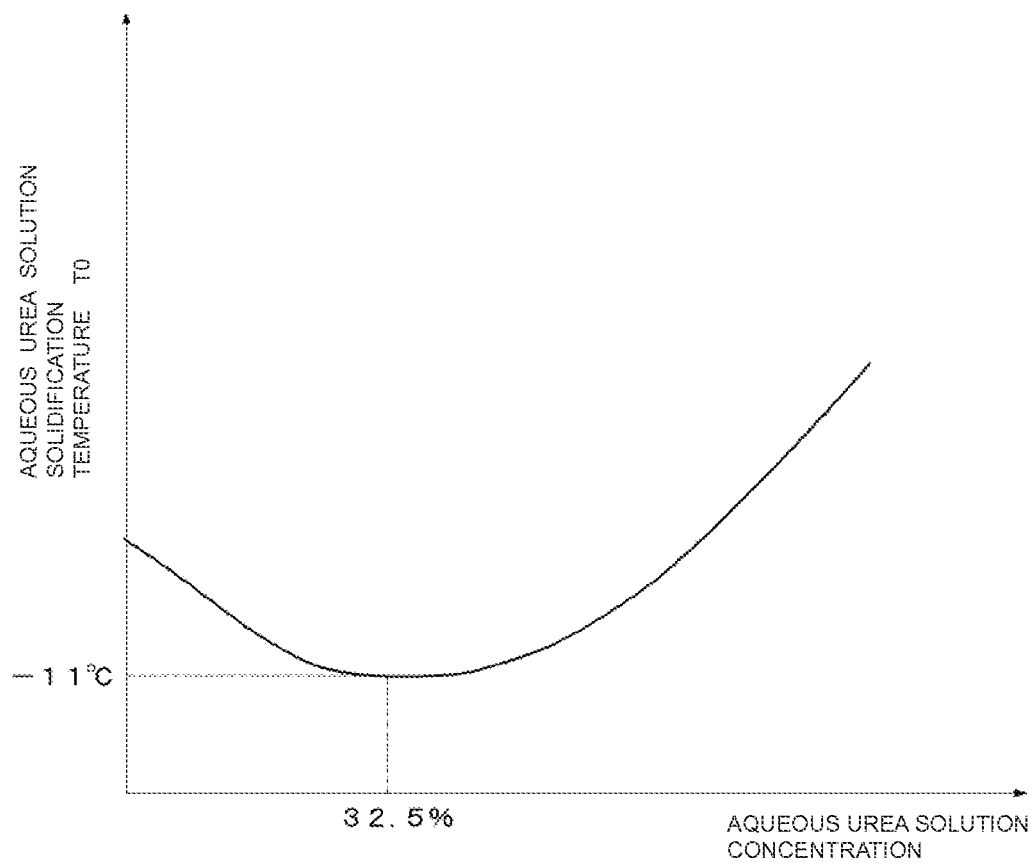

CONTROL TECHNIQUES OF EXHAUST PURIFICATION SYSTEM AND EXHAUST PURIFICATION SYSTEM

BACKGROUND OF THE INVENTION

The present invention relates to an exhaust purifying system and a method for controlling the exhaust purifying system. More particularly, the invention relates to an exhaust purifying system and a method for controlling the exhaust purifying system capable of avoiding occurrence of clogging, breakage, and the like of a reducing agent injection valve and a reducing agent supply path caused by the solidification of an aqueous urea solution.

Conventionally, the exhaust gas of an internal combustion engine installed in a vehicle includes nitrogen oxide (referred to below as "$NO_X$") or particulate matter (sometimes referred to below as "PM"). Of these substances, $NO_X$ is reduced by a urea selective catalytic reduction system to purify exhaust gas. The urea selective catalytic reduction system is configured to include a reducing agent supply apparatus, which supplies, from a reducing agent injection valve to an exhaust pipe, an aqueous urea solution functioning as a reducing agent pumped from a storage tank by a force-feed pump, and a selective catalytic reduction catalyst, which is one of exhaust gas purification catalysts capable of absorbing ammonia. Such a urea selective catalytic reduction system purifies exhaust gas by causing the selective catalytic reduction catalyst to absorb ammonia generated by decomposition of the aqueous urea solution and the $NO_X$ in exhaust gas to react with the ammonia in the selective catalytic reduction catalyst.

On the other hand, there is a diesel particulate filter (referred to below as a DPF) as an apparatus that collects PM and purifies exhaust gas. A DPF is disposed in the exhaust pipe of an internal combustion engine to collect PM in exhaust gas when the exhaust gas passes through the DPF. An exhaust purifying system including a DPF performs forced regeneration control as appropriate in which the PM accumulated on the DPF is forcibly burned by increasing the temperature of the DPF to approximately 500 degrees to 600 degrees to prevent clogging of the DPF.

Recently, as the purification standard of exhaust gas becomes severer, an exhaust purifying system including both a DPF and a selective catalytic reduction catalyst has come into widespread unit.

A urea selective catalytic reduction system is normally configured to recover the aqueous urea solution remaining in the reducing agent supply path when the internal combustion engine stops (see JP-A-2008-101564, for example). This avoids occurrence of clogging, breakage, or the like of the reducing agent supply path due to the freezing of the aqueous urea solution remaining in the reducing agent supply path.

SUMMARY OF THE INVENTION

However, in a reducing agent supply apparatus, a reducing agent (that is, an aqueous urea solution) cannot be completely recovered normally for structural reasons.

Accordingly, the aqueous urea solution remaining in the reducing agent supply path, particularly in the reducing agent injection valve, is heated and concentrated after the internal combustion engine stops, the solidification temperature rises, and the aqueous urea solution solidifies in a subsequent cooling process. As a result, for example, in the exhaust purifying system described in JP-A-2008-101564, the supply of an aqueous urea solution is obstructed during startup of the internal combustion engine, thereby reducing the exhaust gas purification efficiency.

More specifically, the exhaust purifying system generally performs purge processing for recovering the aqueous urea solution filling the reducing agent supply path to the storage tank when the internal combustion engine stops. However, for structural reasons of the reducing agent passage or the like interconnecting the storage tank and the reducing agent injection valve, the aqueous urea solution filling the reducing agent supply path cannot be completely recovered to the storage tank, normally.

On the other hand, since circulation of cooling water, which is a function for radiating the reducing agent injection valve, stops as the internal combustion engine stops, the temperature of particularly the reducing agent injection valve rises. This evaporates water in the aqueous urea solution and increases the concentration of the aqueous urea solution remaining in the above reducing agent injection valve. After that, although the temperature of the aqueous urea solution drops as the temperature of the exhaust pipe or the ambient temperature drops, the concentration of the aqueous urea solution is higher than the normal concentration. Since the solidification temperature becomes higher, the residual aqueous urea solution solidifies, possibly causing clogging of the reducing agent injection valve.

FIG. 8 is a graph showing the relationship between the concentration and the solidification temperature T0 of the aqueous urea solution.

The concentration of an aqueous urea solution used as a reducing agent in the reducing agent supply apparatus is normally adjusted to about 32.5%, which gives the lowest solidification temperature (approximately −11 degrees).

As shown in the graph in FIG. 8, the solidification temperature of the aqueous urea solution is the lowest (approximately −11 degrees) when the concentration of the aqueous urea solution is about 32.5%. Even if the concentration of the aqueous urea solution becomes higher or lower than about 32.5%, the solidification temperature of the aqueous urea solution rises.

Accordingly, the residual aqueous urea solution in the reducing agent injection valve whose concentration has become higher due to evaporation of water at high temperature is likely to solidify when the temperature drops later, causes clogging of the injection port provided in the injection plate of the reducing agent injection valve, the circulation of air or liquid through the injection valve is obstructed during execution of reducing agent recovery processing or during an injection of the reducing agent accompanying a subsequent restart of the internal combustion engine, possibly causing breakage or the like of the reducing agent injection valve in the worst case.

The invention addresses the above problems by taking measures for avoiding clogging of the injection port of the injection plate after an injection from the reducing agent injection valve stops.

That is, an object of the invention is to provide an exhaust purifying system and a method for controlling the exhaust purifying system that make control for avoiding clogging of the injection port of the injection plate after an injection from the reducing agent injection valve is stopped and avoid occurrence of clogging, breakage, or the like of the reducing agent supply path or the reducing agent injection valve (particularly, the injection port of the injection plate) caused by solidification of the aqueous urea solution, thereby preventing reduction in the efficiency of reducing agent recovery processing and exhaust gas purification.

An exhaust purifying system according to an aspect of the present invention has the following structure to solve the above problems, the exhaust purifying system including, sequentially from an exhaust upstream side, a diesel particulate filter that collects exhaust particulate in exhaust gas of an internal combustion engine, a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank, and a selective catalytic reduction catalyst that purifies NOx in the exhaust gas using the aqueous urea solution, the exhaust purifying system including a control apparatus including a waiting time calculation unit that detects an injection valve temperature of the reducing agent injection valve according to detection of turn-off of an ignition switch for stopping the internal combustion engine or detection of an injection stop of the reducing agent injection valve, whichever is earlier, and calculates a waiting time until reducing agent recovery processing starts based on the injection valve temperature and a reducing agent recovery processing permission unit that permits the reducing agent recovery processing under condition of the detection of turn-off of the ignition switch and an elapse of the waiting time.

An exhaust purifying system according to an aspect of the invention has the following structure to solve the above problems, the exhaust purifying system including, sequentially from an exhaust upstream side, a diesel particulate filter that collects exhaust particulate in exhaust gas of an internal combustion engine, a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank, and a selective catalytic reduction catalyst that purifies NOx in the exhaust gas using the aqueous urea solution, the exhaust purifying system including a control apparatus including a waiting time calculation unit that detects an injection valve temperature of the reducing agent injection valve according to detection of turn-off of an ignition switch for stopping the internal combustion engine and calculates a waiting time until reducing agent recovery processing starts based on the injection valve temperature and a reducing agent recovery processing permission unit that permits the reducing agent recovery processing under condition of an elapse of the waiting time.

An exhaust purifying system according to an aspect of the invention has the following structure to solve the above problems, the exhaust purifying system including, sequentially from an exhaust upstream side, a diesel particulate filter that collects exhaust particulate in exhaust gas of an internal combustion engine, a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank, and a selective catalytic reduction catalyst that purifies NOx in the exhaust gas using the aqueous urea solution, the exhaust purifying system including a control apparatus including a waiting time calculation unit that detects an injection valve temperature of the reducing agent injection valve according to detection of an injection stop of the reducing agent injection valve and calculates a waiting time until reducing agent recovery processing starts based on the injection valve temperature and a reducing agent recovery processing permission unit that permits the reducing agent recovery processing under condition of the detection of turn-off of an ignition switch for stopping the internal combustion engine and an elapse of the waiting time.

A method for controlling an exhaust purifying system according to an aspect of the invention has the following structure to solve the above problems, the exhaust purifying system including, sequentially from an exhaust upstream side, a diesel particulate filter that collects exhaust particulate in exhaust gas of an internal combustion engine, a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank, and a selective catalytic reduction catalyst that purifies NOx in the exhaust gas using the aqueous urea solution, the method including the steps of detecting an injection valve temperature of the reducing agent injection valve according to detection of turn-off of an ignition switch for stopping the internal combustion engine or detection of an injection stop of the reducing agent injection valve, whichever is earlier, and calculating a waiting time until reducing agent recovery processing starts based on the injection valve temperature and permitting the reducing agent recovery processing under condition of the detection of turn-off of the ignition switch and an elapse of the waiting time.

A method for controlling an exhaust purifying system according to an aspect of the invention has the following structure to solve the above problems, the exhaust purifying system including, sequentially from an exhaust upstream side, a diesel particulate filter that collects exhaust particulate in exhaust gas of an internal combustion engine, a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank, and a selective catalytic reduction catalyst that purifies NOx in the exhaust gas using the aqueous urea solution, the method including the steps of detecting an injection valve temperature of the reducing agent injection valve according to detection of turn-off of an ignition switch for stopping the internal combustion engine and calculating a waiting time until reducing agent recovery processing starts based on the injection valve temperature and permitting the reducing agent recovery processing under condition of an elapse of the waiting time.

A method for controlling the exhaust purifying system according to an aspect of the invention has the following structure to solve the above problems, the exhaust purifying system including, sequentially from an exhaust upstream side, a diesel particulate filter that collects exhaust particulate in exhaust gas of an internal combustion engine, a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank, and a selective catalytic reduction catalyst that purifies NOx in the exhaust gas using the aqueous urea solution, the method including the steps of detecting an injection valve temperature of the reducing agent injection valve according to detection of an injection stop of the reducing agent injection valve and calculating a waiting time until reducing agent recovery processing starts based on the injection valve temperature and permitting the reducing agent recovery processing under condition of the detection of turn-off of an ignition switch for stopping the internal combustion engine and an elapse of the waiting time.

That is, the exhaust purifying system and the method for controlling the exhaust purifying system according to an aspect of the invention have the above structures for avoiding clogging of the injection port of the injection plate after an injection from the reducing agent injection valve is stopped and avoid occurrence of clogging, breakage, or the like of the reducing agent supply path or the reducing agent injection valve (particularly, the injection port of the injection plate) caused by solidification of the aqueous urea solution, thereby preventing reduction in the efficiency of reducing agent recovery processing and exhaust gas purification.

In the above structures of the exhaust purifying system according to the aspect of the invention and the method for controlling the exhaust purifying system, when an injection from the reducing agent injection valve is performed before an elapse of the waiting time, the waiting time is preferably disabled.

In addition, the waiting time is preferably calculated by calculating a concentration and a solidification temperature of the aqueous urea solution attached to an outer side and an inner side of an injection plate included in the reducing agent injection valve based on the injection valve temperature.

In addition, the waiting time is preferably calculated so that the droplet of the aqueous urea solution attached to the outer side of the injection plate is solidified, but droplet of the aqueous urea solution attached to the inner side of the injection plate is not solidified.

BRIEF DESCRIPTION OF THE DRAWINGS

FIG. 1 is an overall structural diagram showing an exhaust purifying system according to an embodiment of the present invention.

FIG. 2 is a block diagram showing a control apparatus included in the exhaust purifying system according to the embodiment of the invention.

FIG. 3 is a graph showing an example of changes in a reducing agent injection valve temperature, a reducing agent solidification temperature, and the like in the exhaust purifying system according to the embodiment of the invention.

FIG. 4 is a graph showing another example of changes in the reducing agent injection valve temperature, the reducing agent solidification temperature, and the like in the exhaust purifying system according to the embodiment of the invention.

FIG. 5a, FIG. 5b, FIG. 5c and FIG. 5d are schematic views for describing a water absorption effect of a solidification reducing agent by the reducing agent injection valve on which the exhaust purifying system and the method for controlling the exhaust purifying system according to the invention are based.

FIG. 6 is a flowchart for describing an exhaust purifying system and a method for controlling the exhaust purifying system according to a first embodiment of the invention.

FIG. 7 is a flowchart for describing an exhaust purifying system and a method for controlling the exhaust purifying system according to a second embodiment of the invention.

FIG. 8 is a graph showing the relationship between the concentration and the solidification temperature T0 of an aqueous urea solution.

DETAILED DESCRIPTION

An exhaust purifying system and a method for controlling the exhaust purifying system according to embodiments of the present invention will be described specifically with reference to the drawings.

However, the following embodiments are only aspects of the invention and do not limit the invention, so they may be modified within the scope of the invention.

In the drawings, components with the same reference sign are the same member or section and descriptions are omitted as appropriate.

1. Exhaust Purifying System (1) Overall Structure

FIG. 1 is an overall structural diagram showing an exhaust purifying system 10 according to an embodiment of the invention.

The exhaust purifying system 10 includes, as main components, an exhaust purifying unit 20 having a DPF 22 and a selective catalytic reduction catalyst 24, a reducing agent supply apparatus 40 having a reducing agent injection valve 43, and a the control apparatus 60 making forced regeneration control of the DPF 22 and operation control of the reducing agent supply apparatus 40.

The exhaust purifying system 10 is configured as an apparatus for collecting particulate matter (PM) in exhaust gas using the DPF 22 and selectively purifying $NO_X$ in exhaust gas in the selective catalytic reduction catalyst 24 using an aqueous urea solution as a reducing agent.

(2) Exhaust Purifying Unit

The exhaust purifying unit 20 includes, sequentially from an exhaust upstream side, an oxidation catalyst 21, the DPF 22, and the selective catalytic reduction catalyst 24.

Of these components of the exhaust purifying unit 20, the oxidation catalyst 21 oxidizes hydro carbon supplied to an exhaust pipe 11 by a post injection or the like in an internal combustion engine 5 to generate oxidation heat. This rises the temperature of exhaust gas flowing into the DPF 22, thereby heating the DPF 22. The oxidation catalyst 21 may be a known catalyst, which is created by, for example, adding a rare-earth element such as cerium to alumina that carries platinum.

In addition, the DPF 22 collects PM in exhaust gas when the exhaust gas passes through the DPF 22. In the exhaust purifying system 10 shown in FIG. 1, the DPF 22 is disposed upstream of the selective catalytic reduction catalyst 24 in an exhaust path, so PM is not attached to the selective catalytic reduction catalyst 24. The DPF 22 may be known one, for example, a filter having a honeycomb structure made of a ceramic material.

In addition, the selective catalytic reduction catalyst 24 absorbs ammonia generated by decomposition of an aqueous urea solution injected by the reducing agent injection valve 43 into exhaust gas and reduces $NO_X$ in the exhaust gas which flows into. The selective catalytic reduction catalyst 24 can be, for example, a zeolite reducing catalyst that has an ammonia absorption function and selectively reduces $NO_X$.

The exhaust purifying unit 20 described above includes pressure sensors 51 and 52 before and after the DPF 22, and temperature sensors 53 and 54 before and after the selective catalytic reduction catalyst 24. The exhaust purifying unit 20 also includes an $NO_X$ sensor 55 on an exhaust downstream side of the selective catalytic reduction catalyst 24. In addition, an outside air temperature sensor for measuring the outside air temperature is disposed around the exhaust purifying unit.

The sensor values of these sensors are sent to the control apparatus 60 to detect the pressure, temperature, and $NO_X$ concentration of each position.

If estimation is enabled by computation, these sensors may be omitted.

In addition, the exhaust purifying unit 20 described above includes a connection pipe 12 branched from a first bending section 23*a* of the exhaust pipe 11 and fixing the reducing agent injection valve 43. Via the connection pipe 12, the aqueous urea solution as a reducing agent is injected from the reducing agent injection valve 43 in a direction substantially the same as the flow direction of the exhaust gas.

Accordingly, as compared with the case where the reducing agent injection valve 43 is directly fixed to the exhaust pipe 11, heat is not easily conducted from the exhaust pipe 11, exhaust gas, or the like to the reducing agent injection valve 43.

(3) Forced Regeneration Means

The exhaust purifying system 10 in the present embodiment includes forced regeneration means for performing the forced regeneration control of the DPF 22. This forced regeneration means performs forced regeneration control for heating the DPF 22 to approximately 500 degrees to 600 degrees to burn the PM accumulated on the DPF 22.

In the embodiment, the forced regeneration means includes a fuel injection valve (not shown) supplying hydro carbon in the exhaust pipe 11 by a post injection in the internal combustion engine 5 or the like, a control unit of the control apparatus 60 for instructing the control of the fuel injection valve such as the amount of fuel injection from the fuel injection valve and the injection timing, and the oxidation catalyst 21 generating oxidation heat by oxidizing hydro carbon.

The structure of the forced regeneration means is not limited to the above example as long as the means can rise the temperature of exhaust gas to approximately 500 degrees to 600 degrees. For example, the forced regeneration means may be configured using an apparatus for supplying hydro carbon to the oxidation catalyst 21 without using a post injection. Alternatively, the forced regeneration means may include a heating device such as a burner or heating wire to heat the DPF 22 directly.

(4) Reducing Agent Supply Apparatus

The reducing agent supply apparatus 40 includes, as main components, a storage tank 41 storing an aqueous urea solution, a force-feed pump 42, and the reducing agent injection valve 43.

Of these components, the storage tank 41 and the force-feed pump 42 are connected by a first supply passage 44, and the force-feed pump 42 and the reducing agent injection valve 43 are connected by a second supply passage 45. This second supply passage 45 is provided with a pressure sensor 56, a sensor value is sent to the control apparatus 60, and the pressure in the second supply passage 45 is detected.

In addition, the second supply passage 45 and the storage tank 41 are connected by a third supply passage 46. Accordingly, the excessive aqueous urea solution supplied to the second supply path 45 can be returned to the storage tank 41.

(5)

In addition, the reducing agent supply apparatus 40 is provided with a reverting valve 47 having a function of switching the passage of aqueous urea solution from a forward direction (from the storage tank 41 to the reducing agent injection valve 43) to the reverse direction (from the reducing agent injection valve 43 to the storage tank 41). That is, the exhaust purifying system 10 in the embodiment is configured to be able to recover the aqueous urea solution filling the reducing agent supply apparatus 40 to the storage tank 41 when the internal combustion engine 5 stops.

Of these components of the reducing agent supply apparatus 40, the force-feed pump 42 pumps up the aqueous urea solution in the storage tank 41 and pressure-feeds it to the reducing agent injection valve 43 in order to keep the pressure in the second supply path 45 to a predetermined value. Typically, an electric pump is used as the force-feed pump 42.

In addition, when the reducing agent injection valve 43 is opened according to a control signal output from the control apparatus 60, the reducing agent injection valve 43 injects the aqueous urea solution into the exhaust pipe 11. The reducing agent injection valve 43 is, for example, an ON-OFF valve in which the turn-of and turn-off of valve open is controlled by DUTY control.

Electronic parts and resin parts constituting this type of reducing agent injection valve 43 are relatively sensitive to heat and the heat resistance $T_{lim}$ is approximately 140 degrees to 150 degrees and the exhaust gas temperature during normal operation is approximately 200 degrees to 300 degrees.

Accordingly, the reducing agent supply apparatus 40 includes a cooling water passage 35 provided in the housing of the reducing agent injection valve 43, cooling water circulation passages 33 and 34 branched from a cooling water passage 33 of the internal combustion engine 5 and communicating with the cooling water passage 35, and cooling water flow rate control valves 31 and 32 adjusting the flow rate of cooling water flowing through the cooling water circulation passages 33 and 34.

Accordingly, it is possible to circulate the cooling water of the internal combustion engine 5 through the cooling water passage 35 of the reducing agent injection valve 43, keep the temperature of the reducing agent injection valve 43 at approximately 70 degrees to 80 degrees, and prevent heat damage of the reducing agent injection valve 43.

In addition, since the aqueous urea solution at relatively low temperature in the storage tank 41 is pressure-fed to the reducing agent injection valve 43 to inject the reducing agent from the reducing agent injection valve 43, heat transfer from the reducing agent injection valve 43 to the aqueous urea solution also promotes the radiation of the reducing agent injection valve 43.

The radiation of the reducing agent injection valve 43 due to the circulation of the engine cooling water and the heat transfer to the aqueous urea solution as described above is performed particularly during operation of the internal combustion engine 5.

This is because the engine cooling water circulates during operation of the internal combustion engine 5 and the aqueous urea solution is pressure-fed to the reducing agent injection valve 43 during operation of the internal combustion engine 5.

2. Control Apparatus (1) Overall Structure

Next, with reference to FIG. 2, the control apparatus 60 included in the exhaust purifying system 10 according to an embodiment of the invention will be described specifically by broadly dividing the control apparatus 60 into an injection valve operation detection unit 61, a temperature detection unit 62, a forced regeneration control unit 63, a waiting time calculation unit 64, and a reducing agent recovery processing permission unit 65. These components are typically achieved by executing a program using a microcomputer.

That is, FIG. 2 is an example of the structure showing the sections related to control for avoiding clogging of the injection port of the injection plate of the control apparatus 60 included in the exhaust purifying system 10, as functional blocks after an injection from the reducing agent injection valve is stopped.

The control apparatus 60 is configured to be able to read the signal of an ignition switch 57 and various types of sensor signals of pressure sensors, temperature sensors, an engine speed sensor for detecting engine speed Ne, a vehicle speed sensor for detecting vehicle speed V, an accelerator sensor for detecting the operation amount Acc of the accelerator pedal, a brake sensor for detecting the operation amount Brk of the brake pedal, and so on. In addition, the control apparatus 60 has a RAM (Random Access Memory) (not shown) for storing the calculation results and detection results of individual units.

During operation of the internal combustion engine 5, the control apparatus 60 controls the driving of the force-feed pump 42 to keep the pressure in the second supply path 45 at a predetermined value and controls the driving of the reducing agent injection valve 43 based on the engine speed Ne and the sensor value of the $NO_X$ sensor 55 provided on downstream of the selective catalytic reduction catalyst in an exhaust path, and so on.

In addition, the control apparatus 60 is configured to detect on and off signals from the ignition switch 57 for starting and stopping the internal combustion engine and preferably detects operation (particularly, an injection start and an injection stop) of the reducing agent injection valve 43. If detecting the off signal from the ignition switch 57 or the injection stop of the reducing agent injection valve 43 when the internal combustion engine 5 stops, the control apparatus 60 detects an injection valve temperature $T_{udv}$ of the reducing agent injection valve 43 at the time of detection of the off signal or the time of detection of the injection stop whichever is earlier and, based on the injection valve temperature $T_{udv}$, calculates a waiting time T1, and permits reducing agent recovery processing after an elapse of the waiting time T1 from the earlier time of detection.

In addition, according to the permission of reducing agent recovery processing after an elapse of the above waiting time T1, the control apparatus 60 performs reducing agent recovery processing, that is, purge processing. That is, the control apparatus 60 outputs a signal for switching the passage of the aqueous urea solution from the forward direction to the reverse direction to the reverting valve 47 and outputs a signal for opening the reducing agent injection valve 43 and driving the force-feed pump 42 to the force-feed pump 42 and the reducing agent injection valve 43, so that the reducing agent in the reducing agent injection valve 43 and the reducing agent supply path is recovered to the storage tank 41.

The control apparatus 60 included in the exhaust purifying system 10 according to an embodiment of the invention provides the waiting time T1 for waiting the droplet of the aqueous urea solution attached to the vicinity of the injection port in the reducing agent injection valve 43 to be absorbed outside the reducing agent injection valve 43 using a water absorption effect describe later before executing reducing agent recovery processing to make control for avoiding clogging of the injection port of the injection plate after an injection from the reducing agent injection valve is stopped, and then executes reducing agent recovery processing to avoid occurrence of clogging, breakage, or the like of the reducing agent supply path or the reducing agent injection valve (particularly, the injection port of the injection plate) caused by solidification of the aqueous urea solution, thereby preventing reduction in the efficiency of reducing agent recovery processing and exhaust gas purification.

(2) Injection Valve Operation Detection Unit

The injection valve operation detection unit 61 detects the operation, particularly, an injection start and an injection stop of the reducing agent injection valve 43.

Of the embodiments of the exhaust purifying system and the method for controlling the exhaust purifying system according to the invention, the embodiment that makes control based on detection of an injection stop of the reducing agent injection valve 43 in addition to detection of turn-off of the ignition switch 57 calculates the waiting time T1 based on the injection valve temperature $T_{udv}$ at the time of detection of the injection stop. Accordingly, the injection valve operation detection unit 61 detects an injection stop of the reducing agent injection valve 43.

In the embodiment, when an injection from the reducing agent injection valve 43 is started again before an elapse of the waiting time T1 in the embodiment, the timer for measuring a time T needs to be reset. Accordingly, the injection valve operation detection unit 61 also detects an injection start of the reducing agent injection valve 43.

(3) Temperature Detection Unit

The temperature detection unit 62 detects the injection valve temperature $T_{udv}$ of the reducing agent injection valve 43 using a temperature sensor 53. However, when direct detection cannot be performed, the temperature detection unit 62 may calculate or infer the temperature based on a DPF 22 downstream side temperature $T_{dpf}$ in the vicinity or the like.

(4) Forced Regeneration Control Unit

The forced regeneration control unit 63 estimates a PM accumulation amount Vpm based on the pressure difference detected by the pressure sensors 51 and 52 provided before and after the DPF 22. Then, when the estimated PM accumulation amount Vpm exceeds a predetermined threshold Vpm0, the forced regeneration control unit 63 determines the necessity of forced regeneration of the DPF 22 and sends a signal for performing forced regeneration to the forced regeneration means.

When the estimated PM accumulation amount Vpm is reduced to the predetermined amount, the forced regeneration control unit 63 stops sending the signal for performing forced regeneration to the forced regeneration means.

(5) Waiting Time Calculation Unit

The waiting time calculation unit 64 detects the injection valve temperature $T_{udv}$ of the reducing agent injection valve 43 at the time of detection of turn-off of the ignition switch 57 or at the time of detection of an injection stop of the reducing agent injection valve 43 via the injection valve operation detection unit 61, whichever is earlier. Here, "detection of the injection valve temperature $T_{udv}$" includes, for example, calculation or inference based on the DPF 22 downstream side temperature $T_{dpf}$ or the like in the vicinity of the injection valve 43 in addition to the direct detection of the injection valve temperature $T_{udv}$ described above.

Then, the waiting time calculation unit 64 calculates the waiting time T1 based on the injection valve temperature $T_{udv}$ of the reducing agent injection valve 43 at the earlier time of detection. The waiting time T1 is used as the waiting time from the above earlier time of detection until the reducing agent recovery processing is permitted in the operation procedure of control, which will be described later.

In the exhaust purifying system and the method for controlling the exhaust purifying system according to the invention, a general reason why the waiting time T1 is provided before execution of reducing agent recovery processing is that, as described above, the exhaust purifying system and the method for controlling the exhaust purifying system wait for the droplet of the aqueous urea solution attached to the vicinity of the injection port in the reducing agent injection valve 43 to be absorbed outside the reducing agent injection valve 43 due to a water absorption effect to avoid clogging of the injection port of the injection plate after an injection from the reducing agent injection valve is stopped, and then execute reducing agent recovery processing to avoid occurrence of clogging, breakage, or the like of the reducing agent supply path or the reducing agent injection valve (particularly, the injection port of the injection plate) caused by solidification of the aqueous urea solution, thereby preventing reduction in the efficiency of reducing agent recovery processing and exhaust gas purification.

Here, the principle on which the exhaust purifying system and the method for controlling the exhaust purifying system according to the invention are based will be further described in detail.

FIG. 3 is a graph showing an example of changes in the reducing agent injection valve temperature, the reducing agent solidification temperature, and the like in the exhaust purifying system according to the embodiment of the invention.

When the ignition switch 57 is turned off and the internal combustion engine 5 stops at time t1, the cooling water of the internal combustion engine 5 also stops circulating and the radiation efficiency of the reducing agent injection valve 43 reduces. Accordingly, the injection valve temperature $T_{udv}$ of the reducing agent injection valve 43 rises after that for some time, reaches the highest reachable temperature $T_{udvmax}$, and then drops.

Since the injection valve temperature $T_{udv}$ rises after the ignition switch 57 is turned off as described above, the temperature of the aqueous urea solution remaining in the reducing agent injection valve 43 also rises and water in the aqueous urea solution is evaporated to increase the concentration, as a result, the solidification temperature T0 of the residual aqueous urea solution also rises.

That is, as shown in FIG. 3, the solidification temperature T0 of the residual aqueous urea solution also rises with an increase in the concentration of this aqueous urea solution so as to follow a rise in the injection valve temperature $T_{udv}$ with a little delay.

When the injection valve temperature $T_{udv}$ reduces to the solidification point, which is the solidification temperature T0 of the residual aqueous urea solution at time t2, solidification (that is, coagulation) occurs in the residual aqueous urea solution in the reducing agent injection valve 43.

FIG. 4 is a graph showing another example of changes in the reducing agent injection valve temperature, the reducing agent solidification temperature, and the like in the exhaust purifying system according to the embodiment of the invention.

In the example in FIG. 4, the forced regeneration control of the DPF 22 is started at time t0, which is earlier that time t1 at which the ignition switch 57 is turned off, and rises in the injection valve temperature $T_{udv}$ and the DPF 22 downstream side temperature $T_{dpf}$ associated with the forced regeneration control can be seen, but the other points are substantially the same as in the example in FIG. 3.

Rises in the concentration and the solidification temperature T0 due to rises in the temperatures of the aqueous urea solutions shown in the graphs in FIGS. 3 and 4 are caused by the properties of the aqueous urea solution shown in the graph in FIG. 8, and rises in the concentration of the aqueous urea solution and the solidification temperature T0 become larger in a case where rises in the temperature are larger.

Rises in the concentration and the solidification temperature T0 due to rises in the temperature of the aqueous urea solution also occur in the case of the aqueous urea solution remaining in the reducing agent injection valve 43 and in the case of the aqueous urea solution attached to the outer side of the reducing agent injection valve 43. However, since the aqueous urea solution attached to the outer side of the reducing agent injection valve 43 is directly exposed to high temperature exhaust gas passing through the exhaust pipes 11, 23a, and 23b, rises in the concentration and the solidification temperature T0 become larger, the aqueous urea solution attached to the outer side of the reducing agent injection valve 43 is likely to solidify earlier at higher temperature than the aqueous urea solution remaining in the reducing agent injection valve 43.

FIG. 5a, FIG. 5b, FIG. 5c and FIG. 5d are schematic views for describing a water absorption effect of a solidification reducing agent by the reducing agent injection valve on which the exhaust purifying system and the method for controlling the exhaust purifying system according to the invention are based.

As shown in FIG. 5a, the reducing agent injection valve 43 of the reducing agent supply apparatus included in the exhaust purifying system includes a cylinder-shaped member 431 incorporating a narrow section with a through-hole, a pin member 432 that has a tip portion 432a mating with the narrow section and opens or closes the through-hole when driven in the direction of the center axis of cylinder-shaped member 431, and an injection plate (orifice plate) 433 having an injection port 433a for injecting an aqueous urea solution as a reducing agent supplied through the space between the cylinder-shaped member 431 and the pin member 432 and the through-hole.

The aqueous urea solution supplied from the storage tank 41 through a reducing agent supply passage is fed into the cylinder-shaped member 431 of the reducing agent injection valve 43, passes through the through-hole and the space between the cylinder-shaped member 431 and the pin member 432 when the pin member 432 is driven and the tip portion 432a moves away from the narrow section of the cylinder-shaped member 431, and is injected into an exhaust pipe 23b through the injection port 433a of the injection plate 433.

When an injection of the reducing agent from the reducing agent injection valve 43 is stopped by the turn-off of the ignition switch 57 or according to or the operating state of the internal combustion engine, the tip portion 432a of the pin member 432 mates with the narrow section of the cylinder-shaped member 431 as shown in FIG. 5b by driving the pin member 432 to block the reducing agent supply path, and the injection of the reducing agent is stopped.

At this time, in many cases, droplets D1 and D2 of the reducing agent are attached to the outer side and the inner side of the reducing agent injection valve 43 in the vicinity of the injection port 433a of the injection plate 433.

As described above, since the droplet D1 of the reducing agent attached to the outer side of the reducing agent injection valve 43 is directly exposed to high temperature exhaust gas passing through the exhaust pipes, rises in the concentration and the solidification temperature T0 become larger and the droplet D1 solidifies and crystallizes earlier than the droplet D2 remaining in the reducing agent injection valve 43 as shown in FIG. 5c.

Then, due to the water absorption effect of a crystal, as shown in FIG. 5d, the droplet D2 remaining in the reducing agent injection valve 43 is absorbed outside through the injection port 433a so as to be absorbed by the droplet D1 solidified in the outer side.

The exhaust purifying system and the method for controlling the exhaust purifying system according to the invention provide the waiting time T1 after an injection of the reducing agent stops and wait for the droplet of the reducing agent remaining in the vicinity of the injection port 433a in the reducing agent injection valve 43 to be absorbed outside the injection port 433a based on a water absorption effect of the solidification reducing agent, to avoid clogging of the injection port of the injection plate after an injection from the reducing agent injection valve is stopped, and then execute reducing agent recovery processing to avoid occurrence of clogging, breakage, or the like of the reducing agent supply path or the reducing agent injection valve (particularly, the injection port of the injection plate) caused by solidification of the aqueous urea solution, thereby preventing reduction in the efficiency of reducing agent recovery processing and exhaust gas purification.

The waiting time T1 is calculated based on the injection valve temperature $T_{udv}$ of the reducing agent injection valve 43 at the time of detection of turn-off of the ignition switch 57 or the time of detection of an injection stop of the reducing agent injection valve 43, whichever is earlier. Since the reducing agent injection valve 43 stops injecting the reducing agent immediately after the ignition switch 57 is turned off, the time of detection of turn-off of the ignition switch 57 or the time of detection of an injection stop of the reducing agent injection valve 43, whichever is earlier, indicates substantially the same point of time.

The reason why the waiting time T1 is calculated based on the injection valve temperature $T_{udv}$ at this time of detection is that the time required for the solidification of the aqueous urea solution attached to the droplet of the outer side of the reducing agent injection valve 43 depends on the injection valve temperature $T_{udv}$. That is, since rises in the concentration and the solidification temperature T0 of the aqueous urea solution are small when the injection valve temperature $T_{udv}$ is low, the time required for the solidification of the droplet of the aqueous urea solution becomes longer. In contrast, since rises in the concentration and the solidification temperature T0 of the aqueous urea solution are large when the injection valve temperature $T_{udv}$ is high, the time required for the solidification of the droplet of the aqueous urea solution becomes shorter.

Accordingly, the waiting time T1 for which the droplet of the aqueous urea solution attached to the outer side of the reducing agent injection valve 43 is solidified, but the droplet of the aqueous urea solution attached to the inner side of the reducing agent injection valve 43 is not solidified is calculated by considering the highest reachable temperature $T_{udvmax}$ inferred to be reached after that based on the injection valve temperature $T_{udv}$ of the reducing agent injection valve 43 at the above time of detection and considering the temperature difference between the outer side and the inner side of the injection valve.

In the calculation of the waiting time T1, various conditions specific to the target machine may affect the waiting time T1 in addition to the injection valve temperature $T_{udv}$ of the reducing agent injection valve 43. Accordingly, it is preferable to perform a test using the target machine so that the optimum waiting time T1 can be calculated at sufficient accuracy only by identifying the injection valve temperature $T_{udv}$ of the reducing agent injection valve 43 at the above time of detection.

More specifically, in the calculation of the waiting time T1, the highest reachable temperature $T_{udvmax}$ is estimated based on the injection valve temperature $T_{udv}$ of the reducing agent injection valve 43 at the above time of detection, the concentrations of the aqueous urea solutions of the outer side and the inner side of the injection valve are calculated by considering the temperature difference between the outer side and the inner side of the injection valve, the solidification temperatures T0 of the aqueous urea solutions of the outer side and the inner side of the injection valve corresponding to the concentrations are identified based on the characteristic map representing the relationship between the concentration and the solidification temperatures T0 of the aqueous urea solution as in the graph in FIG. 8, and the waiting time T1 for which the droplet of the aqueous urea solution attached to the outer side of the reducing agent injection valve 43 is solidified, but the droplet of the aqueous urea solution attached to the inner side of the reducing agent injection valve 43 is not solidified is calculated. Accordingly, the value of the waiting time T1 should not be necessarily identified strictly and is calculated or selected within some permissible range. The above characteristic map is preferably stored in predetermined storage means in the control apparatus 60.

For more accurate calculation, it is preferable to calculate the concentration and solidification temperature T0 of the residual aqueous urea solution and the waiting time T1 by appropriately combining the temperature gradient $\delta T_{udv}$ of the reducing agent injection valve 43 when reaching the highest reachable temperature $T_{udvmax}$, the outside air temperature $T_{out}$, and other conditions as needed in addition to the injection valve temperature $T_{udv}$ of the reducing agent injection valve 43. This is because, when the temperature gradient $\delta T_{udv}$ is sharp or the outside air temperature $T_{out}$ is high, the concentration of the residual aqueous urea solution is likely to become higher and the solidification temperature T0 of the residual aqueous urea solution also is likely to become higher.

(6) Reducing Agent Recovery Processing Permission Unit

Immediately after the waiting time calculation unit 64 calculates the waiting time T1, the reducing agent recovery processing permission unit 65 starts measuring the time T using a timer and, depending on whether the measured time T has reached the waiting time T1 (T≥T1?) (that is, when the measured time T has reached the waiting time T1), the reducing agent recovery processing permission unit 65 permits reducing agent recovery processing and reducing agent recovery processing starts according to this permission.

Since the calculation of the waiting time T1 by the waiting time calculation unit 64 is instantaneously performed in practice by causing a microcomputer included in the control apparatus 60 to execute a program, the time at which the reducing agent recovery processing permission unit 65 starts measuring the time T using a timer is substantially the same as the time of detection of the injection valve temperature $T_{udv}$ of the reducing agent injection valve 43.

3. Control Method

Specific examples of the exhaust purifying system and the method for controlling the exhaust purifying system according to embodiments of the invention will be described below using flowcharts.

FIG. 6 is a flowchart showing the operation procedure of an exhaust purifying system and a method for controlling the exhaust purifying system according to a first embodiment of the invention. In particular, this flowchart specifically shows the operation procedure in the case where the injection valve temperature $T_{udv}$ is detected according to detection of turn-off of the ignition switch 57 and then the waiting time T1 is calculated.

First, when the control apparatus 60, particularly the waiting time calculation unit 64 detects turn-off of the ignition switch 57 (step S1), the waiting time calculation unit 64 detects the injection valve temperature $T_{udv}$ of the reducing agent injection valve 43 through the temperature detection unit 62 (step S2). Since the reducing agent injection valve 43 stops injecting the reducing agent immediately after the ignition switch 57 is turned off, the injection valve temperature $T_{udv}$ substantially at the time of an injection stop is detected.

The waiting time calculation unit 64 calculates the waiting time T1 based on the detected injection valve temperature $T_{udv}$ (step S3). Specifically, the waiting time calculation unit 64 calculates the concentrations and the solidification temperatures T0 of the aqueous urea solutions of the outer side and the inner side of the injection valve by considering the temperature difference between the outer side and the inner side of the injection valve based on the detected injection valve temperature $T_{udv}$ and calculates the waiting time T1 for which the droplet of the aqueous urea solution attached to the outer side of the reducing agent injection valve 43 is solidified, but the droplet of the aqueous urea solution attached to the inner side of the reducing agent injection valve 43 is not solidified In this process, the waiting time T1 may be calculated by estimating the highest reachable temperature $T_{udvmax}$ based on the injection valve temperature $T_{udv}$ as needed.

Immediately after the waiting time T1 is calculated, the reducing agent recovery processing permission unit 65 starts measuring the time T using a timer (step S4).

Then, the reducing agent recovery processing permission unit 65 determines whether the measured time T has reached the waiting time T1 (T≥T1?) (step S5) and, if the measured time T has reached the waiting time T1, permits reducing agent recovery processing.

When the reducing agent recovery processing permission unit 65 permits the reducing agent recovery processing, the reducing agent supply apparatus 40 starts the reducing agent recovery processing (step S6) according to the permission. After confirming the completion of the reducing agent recovery processing (step S7), the operation in this embodiment ends.

FIG. 7 is a flowchart showing the operation procedure of an exhaust purifying system and a method for controlling the exhaust purifying system according to a second embodiment of the invention. Particularly, this flowchart specifically shows the operation procedure in the case where the injection valve temperature $T_{udv}$ is detected according to detection of an injection stop of the reducing agent injection valve 43 and then the waiting time T1 is calculated.

First, if the control apparatus 60, particularly the injection valve operation detection unit 61 detects an injection stop of the reducing agent injection valve 43 (step S11), the waiting time calculation unit 64 detects the injection valve temperature $T_{udv}$ of the reducing agent injection valve 43 through the temperature detection unit 62 (step S12).

The waiting time calculation unit 64 calculates the waiting time T1 based on the detected injection valve temperature $T_{udv}$ (step S13). The specific calculation method for the waiting time T1 is the same as in the first embodiment.

Immediately after the waiting time T1 is calculated, the reducing agent recovery processing permission unit 65 starts measuring the time T using the timer (step S14).

Since the second embodiment assumes that an injection stop of the reducing agent injection valve 43 is detected before detection of turn-off of the ignition switch 57, an injection from the reducing agent injection valve 43 may be performed again after the waiting time T1 is calculated and the measurement of the time T is started.

When an injection from the reducing agent injection valve 43 is performed again, this injection changes the injection valve temperature $T_{udv}$ and flows or splashes droplets of the aqueous urea solution that are attached to the injection plate 433 on the outer side and the inner side of the reducing agent injection valve 43 and are being solidified. Accordingly, the calculated waiting time T1 should be disabled and the measured time T by the timer should be reset.

Accordingly, after the reducing agent recovery processing permission unit 65 starts measuring the time T using the timer, the injection valve operation detection unit 61 monitors whether an injection from the reducing agent injection valve 43 is performed again (step S15).

When detecting an injection from the reducing agent injection valve 43 before the measured time T reaches the waiting time T1, the injection valve operation detection unit 61 notifies the waiting time calculation unit 64 and the reducing agent recovery processing permission unit 65 of the detection to disable the calculated waiting time T1 and reset the measured time T by the timer. In this case, the operation procedure in the second embodiment returns to the beginning and, when an injection stop of the reducing agent injection valve 43 is detected again, the operation procedure is executed from the first step S11 in sequence again.

In contrast, when an injection from the reducing agent injection valve 43 is not detected, whether turn-off of the ignition switch 57 is detected is monitored (step S16). This is because the detection of turn-off of the ignition switch 57 is a precondition for performing reducing agent recovery processing.

Turn-off of the ignition switch 57 may be detected by the waiting time calculation unit 64 and then reported to the reducing agent recovery processing permission unit 65. Alternatively, turn-off may be detected by the waiting time calculation unit 64 and the reducing agent recovery processing permission unit 65 individually.

Turn-off of the ignition switch 57 may be detected before the measured time T reaches the waiting time T1 or after the measured time T reaches the waiting time T1.

When turn-off of the ignition switch 57 is detected, the reducing agent recovery processing permission unit 65 determines whether the measured time T has reached the waiting time T1 (T≥T1?) (step S17) and, if the measured time T has not reached the waiting time T1, permits reducing agent recovery processing after the measured time T has reached the waiting time T1. In contrast, if the measured time T has reached the waiting time T1, the reducing agent recovery processing permission unit 65 immediately permits reducing agent recovery processing.

After the reducing agent recovery processing permission unit 65 permits reducing agent recovery processing, the reducing agent supply apparatus 40 starts reducing agent recovery processing according to the permission (step S18). After confirming the completion of the reducing agent recovery processing (step S19), the operation procedure in the embodiment ends.

The above operation procedures of the exhaust purifying systems and the methods for controlling the exhaust purifying systems according to the first and second embodiments of the invention shown in the flowcharts in FIGS. 6 and 7 wait for droplets of the reducing agent remaining in the vicinity of the injection port 433a in the reducing agent injection valve 43 to be absorbed outside the injection port 433a to avoid clogging of the injection port of the injection plate after an injection from the reducing agent injection valve is stopped, and then execute reducing agent recovery processing to avoid occurrence of clogging, breakage, or the like of the reducing agent supply path or the reducing agent injection valve (particularly, the injection port of the injection plate) caused by solidification of the aqueous urea solution, thereby preventing reduction in the efficiency of reducing agent recovery processing and exhaust gas purification.

The invention claimed is:

1. An exhaust purifying system comprising:
a diesel particulate filter that collects exhaust particulate in exhaust gas of an internal combustion engine;
a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank;
a selective catalytic reduction catalyst that purifies NOx in the exhaust gas using the aqueous urea solution; and
a control apparatus including a processor configured to
detect an injection valve temperature of the reducing agent injection valve at the time of detection of turn-off of an ignition switch for stopping the internal combustion engine or detection of an injection stop of the reducing agent injection valve, whichever is earlier,
calculate a waiting time until the reducing agent supply apparatus starts to recover the aqueous urea solution in the supply path to the storage tank based on the injection valve temperature, and
permit the reducing agent recovery processing under condition of the detection of turn-off of the ignition switch and an elapse of the waiting time,
wherein the processor is configured to calculate the waiting time by calculating a concentration and a solidification temperature of the aqueous urea solution attached to an outer side and an inner side of an injection plate included in the reducing agent injection valve based on the injection valve temperature.

2. The exhaust purifying system according to claim 1, wherein the processor is further configured to disable the waiting time when an injection from the reducing agent injection valve is performed before an elapse of the waiting time.

3. The exhaust purifying system according to claim 2, wherein the processor is further configured to calculate the waiting time for which a droplet of the aqueous urea solution attached to the outer side of the injection plate is solidified, but a droplet of the aqueous urea solution attached to the inner side of the injection plate is not solidified.

4. The exhaust purifying system according to claim 1, wherein the processor is further configured to calculate the waiting time for which a droplet of the aqueous urea solution attached to the outer side of the injection plate is solidified, but a droplet of the aqueous urea solution attached to the inner side of the injection plate is not solidified.

5. An exhaust purifying system comprising:
a diesel particulate filter that collects exhaust particulate in exhaust gas of an internal combustion engine,
a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank;
a selective catalytic reduction catalyst that purifies NOx in the exhaust gas using the aqueous urea solution; and
a control apparatus including a processor configured to
detect an injection valve temperature of the reducing agent injection valve at the time of detection of turn-off of an ignition switch for stopping the internal combustion engine,
calculate a waiting time until the reducing agent supply apparatus starts to recover the aqueous urea solution in the supply path to the storage tank based on the injection valve temperature, and
permit the reducing agent recovery processing under condition of an elapse of the waiting time,
wherein the processor is configured to calculate the waiting time by calculating a concentration and a solidification temperature of the aqueous urea solution attached to an outer side and an inner side of an injection plate included in the reducing agent injection valve based on the injection valve temperature.

6. The exhaust purifying system according to claim 5, wherein the processor is further configured to calculate the waiting time for which a droplet of the aqueous urea solution attached to the outer side of the injection plate is solidified, but a droplet of the aqueous urea solution attached to the inner side of the injection plate is not solidified.

7. An exhaust purifying system comprising:
a diesel particulate filter that collects exhaust particulate in exhaust gas of an internal combustion engine;
a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank;
a selective catalytic reduction catalyst that purifies NOx in the exhaust gas using the aqueous urea solution; and
a control apparatus including a processor configured to
detect an injection valve temperature of the reducing agent injection valve at the time of detection of an injection stop of the reducing agent injection valve,
calculate a waiting time until the reducing agent supply apparatus starts to recover the aqueous urea solution in the supply path to the storage tank based on the injection valve temperature, and
permit the reducing agent recovery processing under condition of the detection of turn-off of an ignition switch for stopping the internal combustion engine and an elapse of the waiting time,
wherein the processor is configured to calculate the waiting time by calculating a concentration and a solidification temperature of the aqueous urea solution attached to an outer side and an inner side of an injection plate included in the reducing agent injection valve based on the injection valve temperature.

8. The exhaust purifying system according to claim 7, wherein, the processor is further configured to disable the waiting time when an injection from the reducing agent injection valve is performed before an elapse of the waiting time.

9. The exhaust purifying system according to claim 8, wherein the processor is further configured to calculate the waiting time for which a droplet of the aqueous urea solution attached to the outer side of the injection plate is solidified, but a droplet of the aqueous urea solution attached to the inner side of the injection plate is not solidified.

10. The exhaust purifying system according to claim 7, wherein the processor is further configured to calculate the waiting time for which a droplet of the aqueous urea solution attached to the outer side of the injection plate is solidified, but a droplet of the aqueous urea solution attached to the inner side of the injection plate is not solidified.

11. A method for controlling an exhaust purifying system including, sequentially from an exhaust upstream side, a diesel particulate filter that collects exhaust particulate in exhaust gas of an internal combustion engine, a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank, and a selective catalytic reduction catalyst that purifies NOx in the exhaust gas using the aqueous urea solution, the method comprising the steps of:
    detecting, with a processor of a control apparatus, an injection valve temperature of the reducing agent injection valve at the time of detection of turn-off of an ignition switch for stopping the internal combustion engine or detection of an injection stop of the reducing agent injection valve, whichever is earlier;
    calculating, with the processor of the control apparatus, a waiting time until the reducing agent supply apparatus starts to recover the aqueous urea solution in the supply path to the storage tank based on the injection valve temperature; and
    permitting, with the processor of the control apparatus, the reducing agent recovery processing under condition of the detection of turn-off of the ignition switch and an elapse of the waiting time,
    wherein calculating the waiting time includes calculating a concentration and a solidification temperature of the aqueous urea solution attached to an outer side and an inner side of an injection plate included in the reducing agent injection valve based on the injection valve temperature.

12. A method for controlling an exhaust purifying system including, sequentially from an exhaust upstream side, a diesel particulate filter that collects exhaust particulate in exhaust gas of an internal combustion engine, a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank, and a selective catalytic reduction catalyst that purifies NOx in the exhaust gas using the aqueous urea solution, the method comprising the steps of:
    detecting, with a processor of a control apparatus, an injection valve temperature of the reducing agent injection valve at the time of detection of turn-off of an ignition switch for stopping the internal combustion engine; and
    calculating, with the processor of the control apparatus, a waiting time until the reducing agent supply apparatus starts to recover the aqueous urea solution in the supply path to the storage tank based on the injection valve temperature; and
    permitting, with the processor of the control apparatus, the reducing agent recovery processing under condition of an elapse of the waiting time,
    wherein calculating the waiting time includes calculating a concentration and a solidification temperature of the aqueous urea solution attached to an outer side and an inner side of an injection plate included in the reducing agent injection valve based on the injection valve temperature.

13. A method for controlling an exhaust purifying system including, sequentially from an exhaust upstream side, a diesel particulate filter that collects exhaust particulate in exhaust gas of an internal combustion engine, a reducing agent supply apparatus that supplies and injects an aqueous urea solution as a reducing agent to the exhaust gas by supplying the aqueous urea solution from a storage tank to a reducing agent injection valve and, when stopping the internal combustion engine, recovers the aqueous urea solution in a supply path to the storage tank, and a selective catalytic reduction catalyst that purifies NOx in the exhaust gas using the aqueous urea solution, the method comprising the steps of:
    detecting, with a processor of a control apparatus, an injection valve temperature of the reducing agent injection valve at the time of detection of an injection stop of the reducing agent injection valve; and
    calculating, with the processor of the control apparatus, a waiting time until the reducing agent supply apparatus starts to recover the aqueous urea solution in the supply path to the storage tank based on the injection valve temperature; and
    permitting, with the processor of the control apparatus, the reducing agent recovery processing under condition of the detection of turn-off of an ignition switch for stopping the internal combustion engine and an elapse of the waiting time,
    wherein calculating the waiting time includes calculating a concentration and a solidification temperature of the aqueous urea solution attached to an outer side and an inner side of an injection plate included in the reducing agent injection valve based on the injection valve temperature.

\* \* \* \* \*